United States Patent [19]

Wutz et al.

[11] Patent Number: 5,739,212
[45] Date of Patent: Apr. 14, 1998

[54] WATER-SOLUBLE GRAFT POLYMERS

[75] Inventors: Konrad Wutz, Trostberg; Josef Weichmann, Pleiskirchen; Alfred Kern, Kirchweidach; Hans-Günter Rosenbauer, Trostberg, all of Germany

[73] Assignee: SKW Trostberg Aktiengesellschaft, Trostberg, Germany

[21] Appl. No.: 545,546

[22] Filed: Oct. 19, 1995

Related U.S. Application Data

[63] Continuation of Ser. No. 163,364, Dec. 17, 1993, abandoned.

[30] Foreign Application Priority Data

Dec. 8, 1992 [DE] Germany .................. 42 41 295.1

[51] Int. Cl.$^6$ ........................................ C08G 63/91
[52] U.S. Cl. .................. 525/411; 525/412; 525/404; 106/655; 106/728; 106/810; 528/393
[58] Field of Search ...................... 106/810, 728, 106/655; 525/411, 412, 404; 528/393

[56] References Cited

U.S. PATENT DOCUMENTS

| | | | |
|---|---|---|---|
| 3,352,806 | 11/1967 | Hicks | 260/29.4 |
| 4,137,279 | 1/1979 | Smith et al. | 525/411 |
| 4,146,488 | 3/1979 | Martin | 252/34.7 |
| 4,272,619 | 6/1981 | Balle et al. | 525/187 |
| 4,814,014 | 3/1989 | Arfari | 524/4 |

FOREIGN PATENT DOCUMENTS

| | | |
|---|---|---|
| 674488 | 12/1965 | Belgium . |
| 271435 | 6/1988 | European Pat. Off. . |

*Primary Examiner*—Melvyn I. Marquis
*Attorney, Agent, or Firm*—Felfe & Lynch

[57] ABSTRACT

Water-soluble graft polymers are described which have been produced by a) radical grafting of a polyalkylene oxide of the general formula I $$R^1[(OCH_2-CH)_x(OCH_2-C-CH_2)_y(OCH_2-CH)_x]OR^3$$

with pendant groups:
- $R^2$ (top of central carbon)
- $(CH_2)_y$
- $(OCH_2-CH)_x(OCH_2-CH)_xOH$
- $R^2$ substituents in which
$R^1 = -H, -C_nH_{2n+1}, -C_6H_4-C_nH_{2n+1},$ $-CH_2-C-(CH_2OH)_2, -CH_2-CH-CH_2OH,$
      $|$                           $|$
      $C_2H_5$                     $OH$ $-(CH-R^2)_m NHR^2, -(CH-R^2)_m OH, -(CH-R^2)_m -COOH, -CO-R^5$ $R^2 = -H, -CH_3, -C_2H_5$ $R^3 = -H, -C_nH_{2n+1}, -C_mH_{2m}-SO_3Na, -(CH-R^2)_m NHR^2, -(CH-R^2)_m OH, -(CH-R^2)_m -COOH, -CO-R^5$ $R^4 = -H, -(CH-R^2)_m -COOH, -CO-R^5$ $R^5 = -C_mH_{2m+1}, -C_6H_5, -(CH-R^2)_m -COOH, -C_6H_4-COOH$ n denotes 1–18, m denotes 1–5, x denotes 2–200, y denotes 0 or 1 with an ethylenically unsaturated mono or dicarboxylic acid or their anhydride and subsequently b) derivatising with a primary or secondary amine and/or alcohol.

These graft polymers are suitable as dispersants for inorganic binding agents containing water such as e.g. cement, gypsum, anhydrite.

23 Claims, No Drawings

WATER-SOLUBLE GRAFT POLYMERS

This application is a continuation of application Ser. No. 08/163,364, filed Dec. 7, 1993, abandoned.

FIELD OF THE INVENTION

The present invention concerns water-soluble graft polymers and their use as dispersants for inorganic binding agents containing water or aqueous clay suspensions, air-entraining agents or agents which retard the setting of mortar, concrete etc. as well as retention agents for aqueous systems.

BACKGROUND OF THE INVENTION

The graft polymer class of compounds which is well-known in polymerization technology is composed of a main chain ("backbone") onto which monomers are grafted as side branches at irregular distances. Polyalkylene glycols are very often used to form the main chain because CH bonds in the vicinity of a CO ether bond are activated and can therefore be radically substituted. Graft polymers which have been produced by radical grafting of a polyalkylene glycol with an ethylenically unsaturated carboxylic acid derivative are already known from the state of the art.

Thus for example the production of polyurethane prepolymers containing carboxylic acids which are obtained by radical grafting of ethylenically unsaturated dicarboxylic acids onto polyalkylene glycols and by subsequent reaction with polyisocyanates is described in U.S. Pat. No. 4,460,738.

According to U.S. Pat. No. 4,528,334 acrylic acid is grafted onto polyoxyalkylene glycols and the graft polymer formed in this process is used as lubricant.

Finally graft polymers are known from EP-A 271 435 in which ethylenically unsaturated monomers, such as e.g. acrylic acid derivatives are grafted onto polyalkylene glycols. The graft polymers produced in this manner are suitable as dispersants in compositions containing cement.

The technical properties of application of these products are, however, unsatisfactory because, on the one hand, these graft polymers have strong air-entraining properties and in addition the concrete products produced with this dispersants still do not have optimal compressive strengths.

OBJECT OF THE INVENTION

The object of the present invention was therefore to develop water-soluble graft polymers which do not have the said disadvantages of the state of the art, are technically relatively simple to produce and have good technical properties of application.

DESCRIPTION OF THE INVENTION

This object is achieved by the water soluble graft polymers of the invention. It has surprisingly turned out that by derivatising the already known graft polymers, the technical properties of application of these products, in particular when used as dispersants for inorganic binding agents containing water, can be decisively improved.

The water-soluble graft polymers according to the invention are defined by their production process which comprises at least two steps. In the first reaction step a polyalkylene glycol of the general formula I

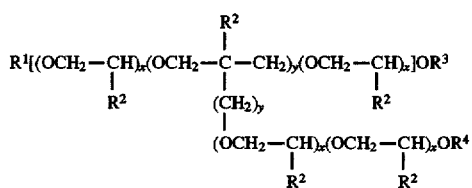

in which $R^1 =$ —H, —$C_nH_{2n+1}$, —$C_6H_4$—$C_nH_{2n+1}$,

—$CH_2$—$C$(—$CH_2OH$)$_2$, —$CH_2$—$CH$—$CH_2OH$,
  |                                      |
  $C_2H_5$                              OH

—$(CH$—$R^2)_m NHR^2$, —$(CH$—$R^2)_m OH$, —$(CH$—$R^2)_m$—COOH, —CO—$R^5$ $R^2 =$ —H, —$CH_3$, —$C_2H_5$ $R^3 =$ —H, —$C_nH_{2n+1}$, —$C_mH_{2m}$—$SO_3Na$, —$(CH$—$R^2)_m NHR^2$, —$(CH$—$R^2)_m OH$, —$(CH$—$R^2)_m$—COOH, —CO—$R^5$ $R^4 =$ —H, —$(CH$—$R^2)_m$—COOH, —CO—$R^5$ $R^5 =$ —$C_mH_{2m+1}$, —$C_6H_5$, —$(CH$—$R^2)_m$—COOH, —$C_6H_4$—COOH n denotes 1–18, m denotes 1–5, x denotes 2–200, y denotes 0 or 1 is radically grafted with an ethylenically unsaturated mono or dicarboxylic acid or their anhydride.

In the polyalkylene oxides used according to the invention which form the main chain of the graft polymers the alkylene radicals can be completely linear ($R^2=H$) such as e.g. in polyethylene glycol, or they can be branched ($R^2= CH_3$, $C_2H_5$) such as e.g. in polypropylene glycol. Polyethylene glycol, polypropylene glycol, polyoxyethylene triol and polyoxypropylene triol or their copolymers are considered to be preferable. The polyalkylene oxides can be etherified with aliphatic or araliphatic radicals preferably at the beginning or end of the chain, with the appropriate aliphatic radicals being comprised of 1 to 18 carbon atoms. The aliphatic radicals can in addition have further functional groups such as e.g. hydroxyl, sulfonate, amino or carboxyl groups.

It is also possible within the scope of the invention to acylate the free OH groups of the polyalkylene oxides before grafting by reaction with appropriate acid chlorides or anhydrides whereby the technically important carboxylic acid anhydrides of monocarboxylic acids such as e.g. acetic acid anhydride, propionic acid anhydride, or of dicarboxylic acids such as e.g. succinic acid anhydride, glutaric acid anhydride or phthalic acid anhydride can be preferably used as the acylating agent. The acylation can also be carried out without difficulty with the appropriate acid chlorides such as e.g. benzoyl chloride.

Ethylenically unsaturated mono or dicarboxylic acids or their anhydrides are then grafted onto these polyalkylene oxides which thus form the side branches of the corresponding graft polymers. Aliphatic derivatives such as e.g. acrylic acid, methacrylic acid, maleic acid, fumaric acid or itaconic acid as well as cyclic derivatives such as e.g. tetrahydrophthalic acid can be used as the ethylenically unsaturated mono or dicarboxylic acids. Instead of the mono or dicarboxylic acid, their anhydride such as e.g. maleic acid anhydride or itaconic acid anhydride are also preferably used.

The ratio by weight of polyalkylene oxide to ethylenically unsaturated mono or dicarboxylic acid or their anhydride can vary within wide limits. However, these starting compounds are preferably used in such an amount that their ratio by weight is within a range of 98:2 to 20:80.

The graft polymerization itself is relatively uncritical and can be carried out without difficulty according to the usual methods and with the known radical starters. Peroxy compounds, azo compounds and redox initiators which are known to a person skilled in the art for radical addition reactions are suitable as starters. Typical examples are TBPTH, TBPEH, DCP, DDEPH. The polymerization itself is preferably carried out at a temperature of 50° to 180° C. and mainly depends on the decomposition temperature of the starter which is used.

Subsequent to the graft polymerization, the carboxylic acid or anhydride groups can be partially converted into the salt form by reaction with bases. This saponification reaction is particularly recommended when carboxylic acid anhydrides have been used for the grafting. It can be carried out with the usual substances which act as bases such as e.g. alkali, alkaline earth or ammonia. Depending on the desired degree of saponification, it is preferable to use 0.5 to 2 mole base in relation to the mono or dicarboxylic acid used. It is also possible to add the basic compounds at a later time i.e. during or after the derivatisation in which the pH value of the graft polymers is preferably adjusted to ca. 7.0 to 8.5.

An essential feature of the invention is that following the graft polymerization the acidic groups are derivatised by reaction with a primary or secondary amine and/or alcohol. In principle all primary or secondary amines can be used for the derivatisation which preferably have an aliphatic, araliphatic, aromatic or heterocyclic radical. In this case the aliphatic radicals can be saturated or unsaturated, linear or branched whereby the hydrocarbon radicals preferably have 1 to 18 carbon atoms. Apart from aliphatic amines, it is also possible to use aromatic derivatives such as e.g. aniline, cyclic derivatives such as e.g. piperidine or heterocyclic derivatives such as e.g. morpholine. It is in addition possible that the radicals of the primary or secondary amine also carry functional groups such as e.g. OH, OR, $NH_2$, $NR^2_2$, $SO_3H$, $SO_3Na$, COOH, COONa etc. Preferred amines with such functional groups are for example sulfanilic acid, 2-aminoethane sulfonic acid as well as glutamic acid and their salts. In particular it is also possible to use polyfunctional amines such as e.g. ethylenediamine, diethylenetriamine or triethylenetetramine as the amine component.

Primary or secondary alcohols can also be used instead of the amines for the derivatisation which preferably have aliphatic, araliphatic, cyclic or aromatic radicals. In this case the aliphatic radical can likewise be saturated or unsaturated, linear or branched and in particular have hydrocarbon radicals with 1 to 18 carbon atoms.

The corresponding primary or secondary alcohols can also, like the amino component carry additional functional groups such as e.g. hydroxyl, alkoxy, amino, carboxyl or sulfonic acid groups. The respective acids can of course easily be substituted by the corresponding salts.

Cyclic alcohols such as e.g. cyclopentanol or cyclohexanol as well as aromatic alcohols such as e.g. phenol can also be used within the scope of the present invention. According to a preferred embodiment, a polyalkylene glycol monoalkyl ether

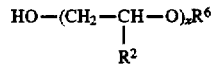

is used as the alcohol component in which x=1 to 100 and $R^6$=—$C_nH_{2n+1}$, —$C_6H_4$—$C_nH_{2n+1}$ with n=1–10. With the aid of this alcohol component the corresponding graft polymers readily become highly fluid even at room temperature and can thus be easily stirred. In addition the water-solubility is substantially increased by the introduction of further ethylene oxide groups.

The required amount of alcohol and/or amine component necessary for the derivatisation mainly depends on the amount of carboxylic acid derivatives used. The amine or alcohol component is preferably used in such an amount that the mole ratio of ethylenically unsaturated mono or dicarboxylic acid or their anhydride to primary or secondary amine or alcohol is in the range 99:1 to 50:50.

The reaction conditions for the derivatisation step (step b) are relatively uncritical and mainly depend on the type of starting components which are used.

Depending on the viscosity of the corresponding graft polymer, the derivatisation can either be carried out free of solvent, in an organic solvent (such as e.g. DMF) or preferably in water whereby it is possible to work in a wide temperature range of 20° to 200° C.

Since, after this derivatisation, the graft polymers according to the invention still contain a certain number of ethylenically unsaturated groups of the carboxylic acid derivatives e.g. in the form of esters it is also possible within the scope of the present invention to carry out an additional radical or nucleophilic addition on these remaining ethylenically unsaturated groups of the carboxylic acid derivatives. Nucleophilic addition in this case is preferably carried out before or after the derivatisation by reaction with alkali sulfites such as e.g. sodium sulfite, sodium bisulfite etc.

The radical addition which can be initiated by the usual starters (initiators) is preferably carried out with vinyl or acryl derivatives of which among the vinyl derivatives N-vinylpyrrolidone, vinylsulfonic acid or styrene have proven to be particularly good. In the case of acryl derivatives, acrylic acid, acrylamide or acrylic acid ester or the corresponding methacrylic acid derivatives are considered preferably, however, other acrylic acid derivatives can also easily be used. Peroxy compounds, azo compounds and redox initiators such as those which are known to a person skilled in the art for radical addition reactions are suitable as starters. Typical examples are TBPTH, TBPEH, DPC, DDEPH.

The amount of reagents used for the radical or nucleophilic addition of course mainly depends on the number of residual ethylenically unsaturated groups in the respective graft polymers. These reagents are preferably used in an amount of 0.1 to 50 mole % in relation to the amount originally used of the ethylenically unsaturated mono or dicarboxylic acids or their anhydrides.

It has proven to be particularly advantageous to carry out this radical or nucleophilic addition in an aqueous medium at a temperature of 20° to 120° C.

The graft polymers according to the invention may be formed as a powder, more or less highly viscous liquid or as an aqueous solution depending on the type of production method or processing. These products have a good solubility in water and have a viscosity of 2.0 to 100.0 cst (at 20° C. and a solids content of 20%).

The graft polymers according to the invention are particularly suitable as dispersants for inorganic binding agents containing water such as e.g. cement, gypsum and anhydrite or deep-well cement slurries. In this case Portland cement, blast-furnace cement and aluminate cement (for example for fireproof materials) come above all into consideration as cements. For this purpose these graft polymers are preferably used in the form of an aqueous solution with a solids content of 20 to 60% by weight. In this connection the graft polymers according to the invention are particularly suitable as dispersants for mixtures containing cement such as e.g. mortar or concrete and if desired, these mixtures can also contain aggregate materials as well as other additives, such as air-entraining agents, dispersants, accelerators or retarders. The graft polymers according to the invention are usually used in this case in an amount of 0.01 to 10% by weight, preferably 0.1 to 5% by weight, relative to the solids content of the respective inorganic binding agent mixture.

Moreover the graft polymers according to the invention can also be used for the dispersion of aqueous clay suspensions such as those which are for example used in drilling muds in the form of bentonite suspensions. In addition the graft polymers according to the invention have air-entraining properties which is why they can be used successfully as air-entraining agents for concrete, mortar etc. Due to their significant retarding properties with regard to the setting of mortar, concrete etc., the graft polymers according to the invention can also be used as setting retarders which enables a substantially longer working time. Finally the graft polymers according to the invention can also be used as retention agents for aqueous systems. These products generally prevent the release of water from systems containing water such as e.g. concrete, mortar, cement slurries, gypsum and anhydrite slurries.

The advantages of the graft polymers according to the invention are their relatively simple and cheap method of production as well as the good technical properties of application of these products such as e.g. only a slight introduction of air as well as good compressive strength of the building products manufactured with these graft polymers.

The following examples are intended to elucidate the invention in more detail.

EXAMPLES

Preparation Example 1 a) Graft Polymerization 60.0 g poly(ethylene/propylene)-glycol-mono-(3-sulfopropyl)-ether sodium salt (average m.w. 1400) and 37.9 g (0.38 mol) maleic anhydride are placed in a three-neck flask provided with KPG stirrer, reflux cooler and thermometer. Afterwards the mixture is heated to 80° C. while stirring. After a homogeneous solution has been formed, 1.2 g tert.-butylperoxy-3,5,5-trimethyl-hexanoate (TBPTH) is added as a radical starter and the solution is heated to 140° C. After a reaction period of one hour, 1.2 g TBPTH is again added. This process is repeated for a further two times in total. After addition of the radical starter has been completed, it is stirred for a further one hour at 140° C.

b) Derivatisation 70.0 g ethylene glycol monomethyl ether (average m.w. 750) is then added to the highly viscous reaction mixture and heated for 2 hours to 140° C. Subsequently it is allowed to cool to room temperature and is neutralised with ca. 125.0 g sodium hydroxide solution (10%) during which the temperature is kept below 30° C. by cooling. The clear, dark red solution which is obtained has a pH value of 7.7 at a solids content of 59.9% and a viscosity at 20° C. of 4.3 cSt as a 20% solution.

Preparation Example 2 a) Graft Polymerization

The graft polymerization of 50.0 g nonylphenol-poly (ethylene/propylene)glycol (average m.w. 1200) with 30.0 g (0.31 mol) maleic anhydride and 6×1.0 g tert.-butyl-peroxy-2-ethyl-hexanoate (TBPEH) is carried out at 110° C. according to the instructions described in production example 1.

b) Derivatisation 20.0 g (0.08 mol) ethylene glycol monomethyl ether (average m.w. 200) is then added to the highly viscous reaction mixture and heated for 2 hours to 140° C. Subsequently it is allowed to cool to room temperature and 4.0 g (0.03 mol) sulfanilic acid sodium salt dissolved in 20.0 ml water is added to the reaction mixture. Subsequently it is neutralised with ca. 120.0 g sodium hydroxide solution (10%) while stirring vigorously, during which the temperature is kept below 30° C. by cooling. The clear, dark red solution which is obtained has a pH value of 7.4 at a solids content of 45.2% and a viscosity at 20° C. of 22.9 cSt as a 20% solution.

Preparation Example 3 a) Graft Polymerization

The graft polymerization of 50.0 g polyethylene glycol (average m.w. 4000) with 29.4 g (0.30 mol) maleic anhydride and 6×1.0 g TBPEH is carried out at 110° C. according to the instructions described in production example 1.

b) Derivatisation 10.0 g (0.05 mol) ethylene glycol monomethyl ether (average m.w. 200) is then added to the highly viscous reaction mixture and heated for 60 minutes to 140° C. Subsequently it is allowed to cool to room temperature and 29.2 g (0.15 mol) sulfanilic acid sodium salt dissolved in 60.0 ml water is added to the reaction mixture. Subsequently it is neutralised with ca. 120.0 g sodium hydroxide solution (10%) while stirring vigorously, during which the temperature is kept below 30° C. by cooling. The clear, dark red solution which is obtained has a pH value of 7.9 at a solids content of 44.4% and a viscosity at 20° C. of 6.7 cSt as a 20% solution.

Preparation Example 4 a) Graft Polymerization

The graft polymerization of polypropylene triol (average m.w. 1055) with 20.0 g (0.20 mol) maleic anhydride and 2×1.0 g dicumylperoxide (DCP) is carried out at 140° C. according to the instructions described in production example 1.

b) Derivatisation 60.0 g (0.08 mol) ethylene glycol monomethyl ether (average m.w. 750) is then added to the highly viscous reaction mixture and heated for 2 hours to 140° C. Subsequently it is allowed to cool to room temperature and neutralised with ca. 80.0 g sodium hydroxide solution (10%) while stirring vigorously, during which the temperature is kept below 30° C. by cooling. The clear, red solution which is obtained has a pH value of 7.2 at a solids content of 65.3% and a viscosity at 20° C. of 10.8 cSt as a 20% solution.

Preparation Example 5 a) Graft Polymerization

The graft polymerization of 75.0 g polypropylene glycol (average m.w. 1020) with 47.4 g (0.48 mol) maleic anhydride and 3×1.5 g DCP is carried out at 140° C. according to the instructions described in production example 1.

b) Derivatisation 90.0 g (0.12 mol) ethylene glycol monomethyl ether (average m.w. 750) is then added to the highly viscous reaction mixture and heated for 2 hours to 140° C. Subsequently it is allowed to cool to room temperature and neutralised with ca. 215.0 g sodium hydroxide solution (10%) during which the temperature is kept below 30° C. by cooling. The clear, red solution which is obtained has a pH value of 7.4 at a solids content of 49.6% and a viscosity at 20° C. of 6.4 cSt as a 20% solution.

Preparation Example 6 a) Graft Polymerization

The graft polymerization of 50.0 g polypropylene glycol (average m.w. 620) with 42.0 g (0.32 mol) itaconic acid and 6×1.0 g 2,5-dimethyl-2,5-di-(2-ethylhexanoyl-peroxy)-hexane (DDEPH) is carried out at 120° C. according to the instructions described in production example 1.

b) Derivatisation 20.0 g (0.10 mol) ethylene glycol monomethyl ether (average m.w. 200) is then added to the highly viscous reaction mixture and heated for 2 hours to 140° C. Subsequently it is allowed to cool to room temperature and neutralised with ca. 170.0 g sodium hydroxide solution (10%) during which the temperature is kept below 30° C. by cooling. The clear, yellow solution which is obtained has a pH value of 7.7 at a solids content of 45.3% and a viscosity at 20° C. of 4.0 cSt as a 20% solution.

Preparation Example 7 a) Graft Polymerization

The graft polymerization of 70.0 g polyethylene glycol (average m.w. 1540) with 44.2 g (0.45 mol) maleic anhydride and 6×1.4 g TBPEH is carried out at 110° C. according to the instructions described in production example 1.

b) Derivatisation 28.0 g (0.14 mol) ethylene glycol monobutyl ether (average m.w. 200) is then added to the highly viscous reaction mixture and heated for 2 hours to 140° C. Subsequently it is allowed to cool to room temperature and neutralised with ca. 230.0 g sodium hydroxide solution (10%) during which the temperature is kept below 30° C. by cooling. Six portions of 0.6 g $Na_2S_2O_5$ are added to the aqueous graft polymer solution at intervals of 15 minutes in each case and stirred until sulfite is no longer detectable. The clear, dark red solution which is obtained has a pH value of 8.2 at a solids content of 43.0% and a viscosity at 20° C. of 4.7 cSt as a 20% solution.

Preparation Example 8 a) Graft Polymerization

The graft polymerization of 80.0 g polyethylene glycol (average m.w. 1540) with 50.4 g (0.5 mol) maleic anhydride and 6×1.6 g TBPEH is carried out at 110° C. according to the instructions described in production example 1.

b) Derivatisation 32.0 g (0.16 mol) ethylene glycol monobutyl ether (average m.w. 200) is then added to the highly viscous reaction mixture and heated for 2 hours to 140° C. Subsequently it is allowed to cool to room temperature and 0.3 g AIBN as well as 8.0 g (0.11 mol) acrylic acid is added. After a reaction time of one hour it is neutralised with ca. 270.0 g sodium hydroxide solution (10%) during which the temperature is kept below 30° C. by cooling. The clear, yellow solution which is obtained has a pH value of 7.3 at a solids content of 42.0% and a viscosity at 20° C. of 5.8 cSt as a 20% solution.

Preparation Example 9 a) Graft Polymerization

The graft polymerization of 65.0 g polyethylene glycol (average m.w. 1540) with 40.9 g (0.42 mol) maleic anhydride and 6×1.3 g TBPEH is carried out at 110° C. according to the instructions described in production example 1.

b) Derivatisation 6.5 g (0.05 mol) N-vinylpyrrolidone and 0.3 g TBPEH are now added and it is allowed to react for 30 minutes at 110° C. 26.0 g (0.13 mol) ethylene glycol monobutyl ether (average m.w. 200) is then added to the highly viscous reaction mixture and heated for 2 hours to 140° C. Subsequently it is allowed to cool to room temperature and neutralised with ca. 200.0 g sodium hydroxide solution (10%) during which the temperature is kept below 30° C. by cooling. The clear, red solution which is obtained has a pH value of 7.6 at a solids content of 44.6% and a viscosity at 20° C. of 5.0 cSt as a 20% solution.

Preparation Example 10 a) Graft Polymerization

The graft polymerization of 85.0 g polypropylene glycol (average m.w. 2020) with 53.5 g (0.54 mol) maleic anhydride and 3×1.7 g TBPTH is carried out according to the instructions described in production example 1.

b) Derivatisation 34.0 g (0.17 mol) ethylene glycol monobutyl ether (average m.w. 200) is then added to the highly viscous reaction mixture and heated for 2 hours to 140° C. Subsequently it is allowed to cool to room temperature and neutralised with ca. 244.0 g sodium hydroxide solution (10%) during which the temperature is kept below 30° C. by cooling. The clear, red solution which is obtained has a pH value of 7.3 at a solids content of 41.0% and a viscosity at 20° C. of 6.7 cSt as a 20% solution.

Preparation Example 11 a) Graft Polymerization 55.0 g polypropylene glycol (average m.w. 620) and 34.6 g (0.35 mol) maleic anhydride are placed in a three-neck flask provided with KPG stirrer, reflux cooler and thermometer. Afterwards the mixture is heated to 80° C. while stirring. After a homogeneous solution has been formed, 1.1 g TBPEH is added as a radical starter and the solution is heated to 110° C. After a reaction period of one hour, 1.1 g TBPEH is again added. This process is repeated for a further four times in total. After the addition of the radical starter has been completed, it is stirred for a further one hour at 110° C. The highly viscous reaction mixture is then dissolved in 88 ml DMF and cooled to room temperature (solution 1).

b) Derivatisation 35.8 g sodium hydroxide solution (20%) and 22.1 g (0.17 mol) taurine are stirred in a separate beaker until a clear solution is formed (solution 2).

The derivatisation is carried out by adding solution 1 dropwise to solution 2. In this process solution 1 and 132.0 g sodium hydroxide solution (10%) are added simultaneously within 30 minutes in such a way that the pH value of the reaction mixture increases from ca. 5.5 to 7.0 initially to until 8.0 after the addition is completed during which the temperature is kept in the range of 30° to 40° C. After it has been stirred for a further 30 minutes, the reaction mixture is evaporated to dryness in a vacuum. The yellow powder which is obtained has a pH value of 7.5 and a viscosity at 20° C. of 3.53 cSt as a 20% aqueous solution.

Preparation Example 12 a) Graft Polymerization

The graft polymerization of 55.0 g polypropylene glycol (average m.w. 2020) is carried out according to preparation example 11 to obtain solution 1.

b) Derivatisation 35.8 g sodium hydroxide solution (20%) and 30.5 g (0.17 mol) sulfanilic acid are stirred in a separate beaker until a clear solution is formed (solution 2).

The procedure corresponds to the method described in preparation example 11. The yellow powder which is obtained has a pH value of 7.5 and a viscosity at 20° C. of 6.2 cSt as a 20% aqueous solution.

Preparation Example 13 a) Graft Polymerization 75.0 g polypropylene glycol (average m.w. 620) and 47.2 g (0.48 mol) maleic anhydride are placed in a three-neck flask provided with KPG stirrer, reflux cooler and thermometer. Afterwards the mixture is heated to 80° C. while stirring. After a homogeneous solution has been formed, 1.5 g TBPEH is added as a radical starter and the solution is heated to 110° C. After a reaction period of one hour, 1.5 g TBPEH is again added. This process is repeated for a further four times in total. After the addition of the radical starter has been completed, it is stirred for a further one hour at 110° C.

b) Derivatisation 37.5 g (0.40 mol) ethylene glycol monoethyl ether is then added to the highly viscous reaction mixture and kept at 110° C. for 30 minutes. After the reaction solution has cooled to room temperature it is neutralised with ca. 225.0 g sodium hydroxide solution (10%). The clear, dark red solution which is obtained has a pH value of 7.5 at a solids content of 38.8% and a viscosity at 20° C. of 9.3 cSt as a 20% solution.

Preparation Example 14 a) Graft Polymerization 85.0 g polypropylene glycol (average m.w. 4020) and 53.5 g (0.54 mol) maleic anhydride are placed in a three-neck flask provided with KPG stirrer, reflux cooler and thermometer. Afterwards the mixture is heated to 80° C. while stirring. After a homogeneous solution has been formed, 1.8 g TBPEH is added as a radical starter and the solution is heated to 110° C. After a reaction period of one hour, 1.8 g TBPEH is again added. This process is repeated for a further four times. After the addition of the radical starter has been completed, it is stirred for a further one hour at 110° C.

b) Derivatisation 45.0 g (0.51 mol) morpholine is then added to the highly viscous reaction mixture and heated to 100° C. for 1 hour. Subsequent to this the reaction solution is allowed to cool to room temperature and neutralised with ca. 252.0 g sodium hydroxide solution (10%) during which the temperature is kept below 30° C. by cooling. The clear, red solution which is obtained has a pH value of 7.2 at a solids content of 54.7% and a viscosity at 20° C. of 4.9 cSt as a 20% solution.

Preparation Example 15 a) Graft Polymerization 50.0 g polypropylene glycol (average m.w. 2020) and 4.5 g (0.045 mol) succinic anhydride are placed in a three-neck flask provided with KPG stirrer, reflux cooler and thermometer. Afterwards the mixture is heated to 120° C. while stirring and 31.6 g (0.32 mol) maleic anhydride is added. After a homogeneous solution has been formed, 1.0 g TBPTH is added as a radical starter and the solution is heated to 140° C. After a reaction period of one hour, 1.0 g TBPTH is again added. This process is repeated for a further two times in total. After the addition of the radical starter has been completed, it is stirred for a further one hour at 140° C.

b) Derivatisation 60.0 g ethylene glycol monomethyl ether (average m.w. 750) is then added to the highly viscous reaction mixture and heated to 140° C. for 2 hours. Subsequently it is allowed to cool to room temperature and neutralised with ca. 125.0 g sodium hydroxide solution (10%) during which the temperature is kept below 30° C. by cooling. The clear, dark red solution which is obtained has a pH value of 7.4 at a solids content of 54.3% and a viscosity at 20° C. of 4.7 cSt as a 20% solution.

EXAMPLES OF APPLICATION

Application Example 1

Dispersion of Portland Cement

The graft polymers described in the preparation examples are tested according to DIN 1048 part 1 for their flow properties in concrete mixtures.

The following concrete mixtures were produced:

4.2 kg sand 0 to 4 mm 2.3 kg sand 4 to 8 mm 7.0 kg gravel 8 to 16 mm 9.5 kg gravel 16 to 32 mm 5.3 kg PZ 35 F.

Following the measurement of the degree of spreading, cubes with an edge length of 15 cm were prepared and the compressive strength was determined after one day according to DIN 1048 part 1.

TABLE 1

Flow and compressive strength according to DIN 1048 part 1 of concrete mixtures containing graft polymers as additives

| Additive Preparation example | Dosage [% by weight] | W/C | Flow [cm] $a_{10}$ | $a_{40}$ | 1d compressive strength [N/mm$^2$] |
|---|---|---|---|---|---|
| zero value | — | 0.49 | 35.00 | — | — |
| 2 | 0.18 | 0.49 | 51.75 | 43.0 | 7.8 |
| 4 | 0.18 | 0.49 | 47.50 | 41.0 | 11.4 |
| 5 | 0.18 | 0.49 | 49.50 | 42.0 | 9.4 |
| 11 | 0.18 | 0.49 | 51.75 | 42.0 | 8.1 |
| 12 | 0.18 | 0.49 | 51.25 | 45.0 | 7.9 |
| 13 | 0.18 | 0.49 | 56.75 | 48.5 | 5.6 |

Application Example 2

Dispersion of Deep Well Cement Slurries

The dispersive action of the graft polymer according to preparation example 10 on deep well cement slurries is elucidated by the following experiment.

Cement slurries consisting of class H cement and water (w/c=0.38) are prepared according to the instructions established by the American Petroleum Institute (API) in specification RP 10 B, "API Specification for Materials and Testing for Well Cements". In order to investigate the viscosity-reducing action of the respective graft polymers, the additive dissolved in mixing water is used, subsequently the viscosities of the cement slurries are measured with a FANN viscosimeter (model 35 SA, Rotor-Bob R1 B1) at 100° F. and 190° F. at four different shear gradients.

TABLE 2

Viscosity of deep well cement slurries containing a viscosity-reducing graft polymer according to preparation example 10

| Dosage[1] [% by weight] | Temp. [°F] | Decrease in percent of the FANN rheology at rpm | | | |
|---|---|---|---|---|---|
| | | 600 | 300 | 200 | 100 |
| — | 100 | 0 | 0 | 0 | 0 |
| 0.5 | 100 | −71 | −83 | −87 | −91 |
| 1.0 | 100 | −72 | −84 | −87 | −92 |
| — | 190 | 0 | 0 | 0 | 0 |
| 0.5 | 190 | −80 | −87 | −89 | −89 |
| 1.0 | 190 | −83 | −91 | −93 | −94 |

[1]Dosage in relation to cement used

Application Example 3

Dispersion of Bentonite Suspensions

Bentonite suspensions are used as additives in drilling muds to increase the discharge power. However, the drilling mud must remain pumpable in this process i.e. the increase in viscosity caused by bentonite must be controlled by thinners or deflocculants. The dispersive action of the graft polymer according to preparation example 10 on an 8% by weight Tixoton suspension is listed in the following table. The measurement of the rheology was carried out at room temperature with a FANN viscosimeter (model 35 SA, Rotor-Bob R1 B1).

TABLE 3

Decrease in the rheology of a 8% by weight Tixoton slurry after addition of a graft polymer according to preparation example 10

| Dosage[1] [% by weight] | Decrease in percent of the FANN rheology at rpm | | | | | |
|---|---|---|---|---|---|---|
| | 600 | 300 | 200 | 100 | 6 | 3 |
| —[2] | 0 | 0 | 0 | 0 | 0 | 0 |
| 1.0 | −26 | −42 | −48 | −53 | −61 | −64 |
| 3.0 | −54 | −76 | −81 | −87 | −94 | −95 |

[1]Dosage in relation to cement used
[2]8% by weight Tixoton slurry without additive Application Example 4

Air-Entraining Agent

The following example elucidates the air-entraining property of the graft polymers according to preparation example 5.

In order to determine the content of air voids, a standard mortar (DIN 1164) was produced with the appropriate graft polymer. The measurement of the content of air voids is carried out in an air content test instrument with a 1 l pot according to DIN 18855 part 2.

The results are shown in Table 4.

TABLE 4

Standard mortar with air-entraining agent consisting of a graft polymer according to preparation example 5

| No. | W/C | graft polymer [% by weight] | air void content [vol. %] |
|---|---|---|---|
| 1 | 0.5 | — | 5 |
| 2 | 0.478 | 0.9 | 28 |

Application Example 5

Concrete Retarders

The following example demonstrates the delaying action of the graft polymers corresponding to preparation example 10 on cement paste.

A cement paste with a standard rigidity (DIN 1164 part 5) is produced with 500 parts by weight Portland cement of strength category 35 F and water. Subsequently the appropriate graft polymer is added and the setting times are determined with the aid of a Vicat apparatus (DIN 1164).

TABLE 5

Setting times of cement paste

| Additive | Dosage in relation to cement [% by weight] | W/C | setting | |
|---|---|---|---|---|
| | | | Start [h:min] | End [h:min] |
| — | — | 0.30 | 2:35 | 4:10 |
| graft polymer | 0.2 | 0.28 | 4:20 | 5:45 |

The start and end of the setting is clearly shifted to later times by addition of the graft polymer.

Application Example 6

Water Retention

The following example elucidates the water retention properties of the graft polymer corresponding to preparation example 4.

It is intended to illustrate this by the cementing of gas concrete cubes with cement paste to which the graft polymer has been added.

A cement paste is prepared by intensive stirring of 100 parts by weight Portland cement (PZ 35 F) according to DIN 1164 and 36 parts by weight water for one minute and this is applied uniformly to the side surface of a gas concrete cube with an edge length of 4 cm and a specific weight of 0.60 g/cm$^3$. Subsequently the side surface of another gas concrete cube is pressed onto the cement paste and the cubes are allowed to stand for 24 hours. After this time it is examined whether the cementing of the two gas concrete cubes by the cement paste is firm or whether a fracture occurs in the joint when it is pressed.

Cement pastes with a good water retention do not release any water into the absorptive gas concrete and thus exhibit a firm cementing.

If the aforementioned experiment is carried out without additives, then both gas concrete cubes can be separated by light pressure. The cementing does not hold because the water from the cement paste was absorbed into the porous gas concrete and the cement could no longer completely set.

In contrast when 0.4% by weight (in relation to the amount of cement) of the powdery graft polymer is added, the cementing does not break even under strong pressure since the water remained in the cement paste.

We claim:
1. A water-soluble graft polymer prepared by
   a) radical grafting of a polyalkalene oxide of the formula

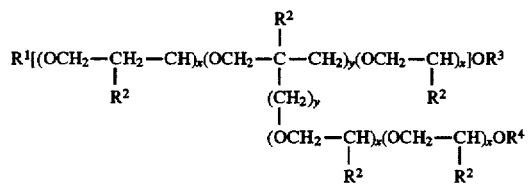

wherein
$R^1$ is —H, —$C_nH_{2n+1}$, —$C_6H_4$—$C_nH_{2n+1}$,

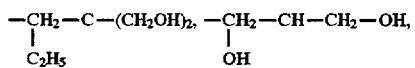

—(CH—$R^2$)$_m$NHR$^2$, —(CH—$R^2$)$_m$OH, —(CH—$R^2$)$_m$—COOH or —CO—R$^5$;

$R^2$ is —H, —$CH_3$ or —$C_2H_5$;

$R^3$ is —H, $C_nH_{2n+1}$, —$C_mH_{2m}$—$SO_3Na$, —(CH—$R^2$)$_m$NHR$^2$, —(CH—$R^2$)$_m$OH, —(CH—$R^2$)$_m$—COOH or —CO—$R^6$;

$R^4$ is —H, —(CH—$R^2$)$_m$—COOH or —CO—$R^5$;

$R^5$ is —$C_mH_{2m+1}$, —$C_6H_5$, —(CH—$R^2$)$_m$—COOH or —$C_6H_4$—COOH;

n is an integer from 1 to 18, m is an integer from 1 to 5,
x is an integer from 2 to 200, and y is 0 or 1;
with an ethylenically unsaturated mono or dicarboxylic acid or an anhydride thereof, and
   b) subsequently derivatizing the carboxylic acid function of the grafted product with a primary or secondary amine and/or an alcohol to form a derivative which is an amide and/or an ester.

2. The graft polymer of claim 1, wherein said polyalkylene oxide is polyethylene glycol, polypropylene glycol, a mixture thereof or a copolymer thereof.

3. The graft polymer of claim 1, wherein said polyalkylene oxide is polyethylene triol, polypropylene triol, a mixture thereof or a copolymer thereof.

4. The graft polymer of claim 1, wherein said ethylenically unsaturated mono or dicarboxylic acid is selected from the group consisting of maleic acid, fumaric acid, itaconic acid and acrylic acid.

5. The graft polymer of claim 1, wherein said ethylenically unsaturated mono or dicarboxylic acid is maleic acid anhydride or itaconic acid anhydride.

6. The graft polymer of claim 1, wherein the weight ratio of polyalkylene oxide to ethylenically unsaturated mono or dicarboxylic acid or anhydride thereof is from 98:2 to 20:80.

7. The graft polymer of claim 1, wherein the radical grafting step is carried out at a temperature of 50° to 180° C.

8. The graft polymer of claim 1, wherein said ethylenically unsaturated mono or dicarboxylic acid or an anhydride thereof is partially converted into a salt by reaction with a base after radically grafting.

9. The graft polymer of claim 1, wherein said grafted product is derivatized with a primary or secondary amine containing an aliphatic, araliphatic, aromatic or heterocyclic radical.

10. The graft polymer of claim 9, wherein said aliphatic radical is a saturated or unsaturated optionally branched hydrocarbon radical of 1 to 18 carbon atoms.

11. The graft polymer of claim 9, wherein said primary or secondary amine radicals still comprise OH, OR, $NH_2$, $NR^2_2$, $SO_3H$, $SO_3Na$, COOH or COONa functional groups.

12. The graft polymer of claim 1, wherein said grafted product is derivatized with a primary or secondary alcohol comprising aliphatic, araliphatic, cyclic or aromatic radicals.

13. The graft polymer of claim 12, wherein said aliphatic radical is a saturated or unsaturated optionally branched hydrocarbon radical of 1 to 18 carbon atoms.

14. The graft polymer of claim 12, wherein said grafted product is derivatized with a polyalkylene glycol monoalkyl ether of the formula

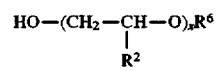

wherein $R^6$ is —$C_nH_{2n+1}$, or —$C_6H_4$—$C_nH_{2n+1}$, n is an integer from 1 to 10, and x is an integer from 1 to 100.

15. The graft polymer of claim 1, wherein the mol ratio of said ethylenically unsaturated mono or dicarboxylic or an anhydride thereof to said primary or secondary amine or alcohol is from 99:1 to 50:50.

16. The graft polymer of claim 1, wherein said grafted product is derivatized, optionally in water, at a temperature of 20° to 200° C.

17. The graft polymer of claim 1, wherein, before or after said derivatization, said ethylenically unsaturated groups of the carboxylic acid derivatives are subjected to a radical or nucleophilic addition.

18. The graft polymer of claim 17, wherein said nucleophilic addition is carried out by reaction with a sodium sulfite.

19. The graft polymer of claim 17, wherein said radical addition is carried out by reaction with a vinyl or acrylic derivative.

20. The graft polymer of claim 19, wherein the radical addition is carried out with a vinyl derivative selected from the group consisting of N-vinylpyrrolidone, vinylsulfonic acid or styrene.

21. The graft polymer of claim 19, wherein said radical addition is carried out with an acrylic derivative selected from the group consisting of acrylic acid, acrylamide or an acrylic acid ester.

22. The graft polymer of claim 18, wherein said sodium sulfite is used in an amount of 0.1 to 50 mol-% based on the amount of ethylenically unsaturated mono or dicarboxylic acid or its anhydride.

23. The graft polymer of claim 19, wherein said radical addition is carried out in an aqueous medium at a temperature of 20° to 120° C.

* * * * *